Figure 1:
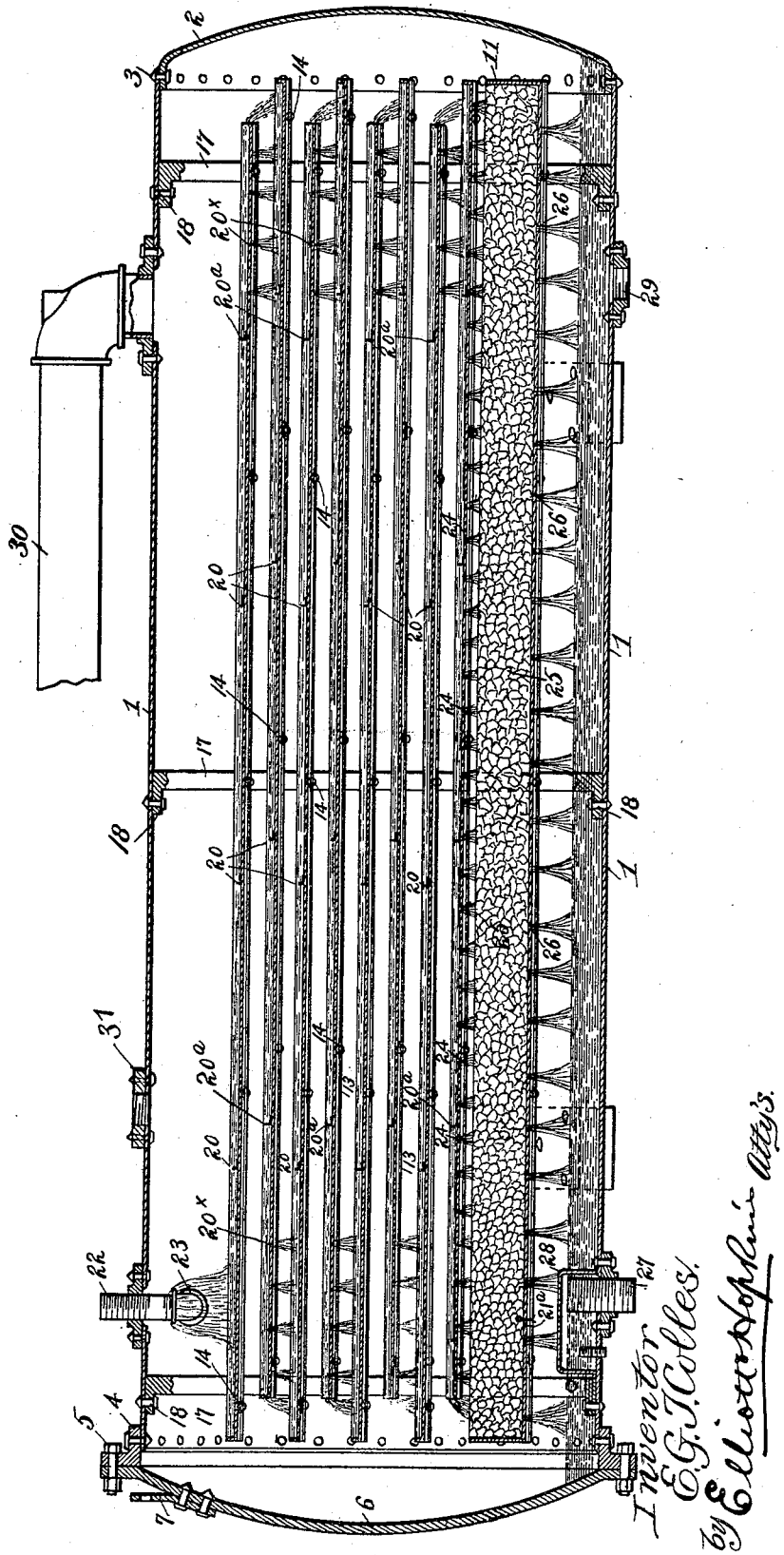

(No Model.)  2 Sheets—Sheet 1.

E. G. T. COLLES.
COMBINED FEED WATER HEATER AND PURIFIER.

No. 522,006. Patented June 26, 1894.

(No Model.) 2 Sheets—Sheet 2.
E. G. T. COLLES.
COMBINED FEED WATER HEATER AND PURIFIER.
No. 522,006. Patented June 26, 1894.
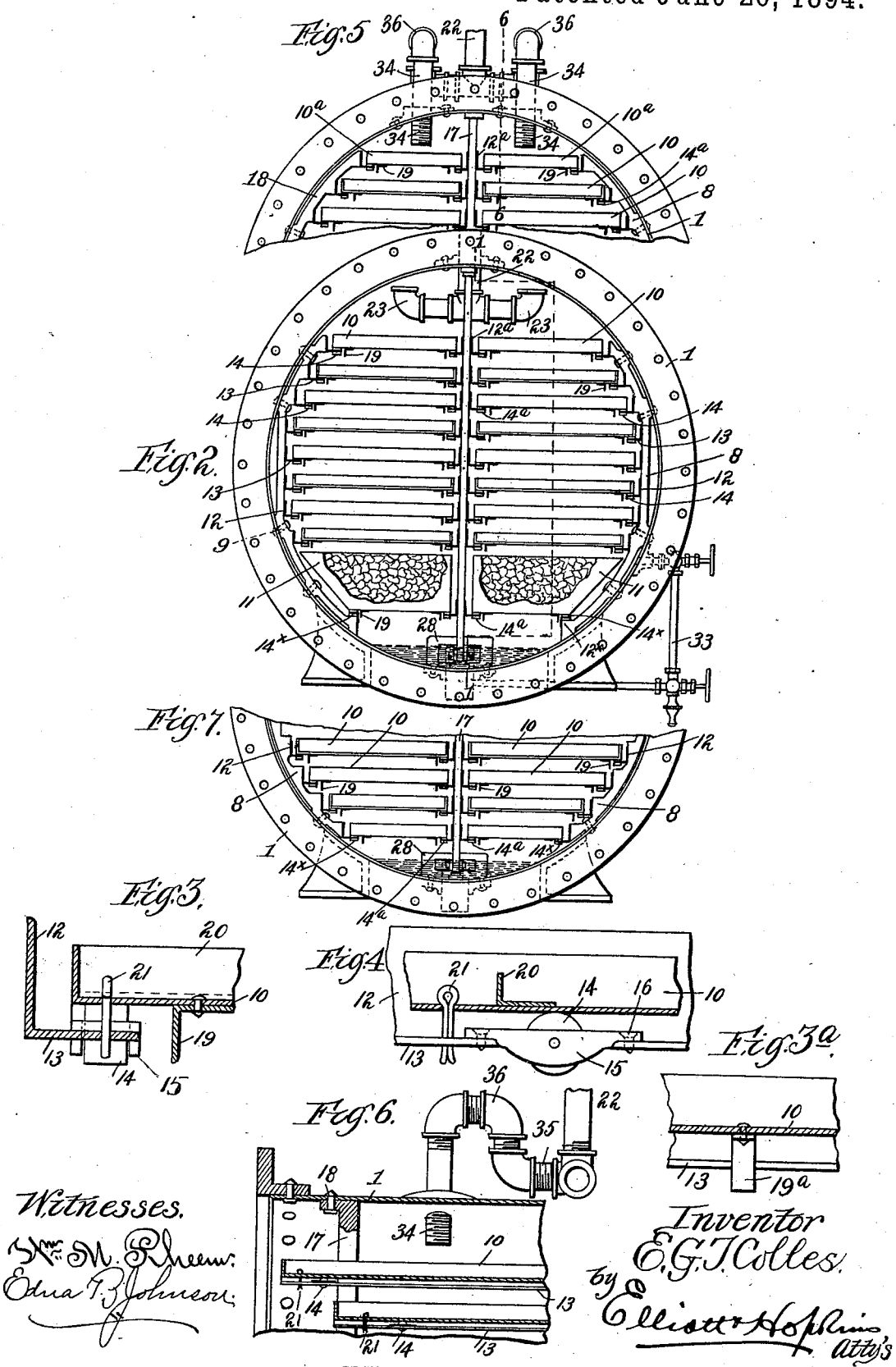
Witnesses.
Wm. W. Rheem.
Edna T. Johnson.
Inventor
E. G. T. Colles.
by
Elliott & Hopkins
Att'ys

UNITED STATES PATENT OFFICE.

EDWARD G. T. COLLES, OF CHICAGO, ILLINOIS.

COMBINED FEED-WATER HEATER AND PURIFIER.

SPECIFICATION forming part of Letters Patent No. 522,006, dated June 26, 1894.

Application filed March 7, 1894. Serial No. 502,680. (No model.)

*To all whom it may concern:*

Be it known that I, EDWARD G. T. COLLES, a citizen of the United States, residing at Chicago, in the county of Cook and State of Illinois, have invented certain new and useful Improvements in a Combined Feed-Water Heater and Purifier, of which the following is a full, clear, and exact specification.

My invention relates to that class of feed water heaters and purifiers in which a number of shallow removable sediment pans are arranged in tiers in such a manner that the water falling upon one will run off into the next lower one and thus running over each pan in the tier finally reaches a filter near the bottom through which the water passes preparatory to its admission into the boiler.

One of the objects of my invention is to provide an improved arrangement and construction of the sediment pans whereby the water and steam will be more intimately commingled and the pans may be more readily and conveniently handled in being inserted or removed from the shell.

Another object of my invention is to make a water seal for the water inlet without occupying pan-space within the shell, and thus providing for additional pans and increasing the capacity and efficiency of the apparatus.

Another object of my invention is to improve the form of the pans whereby the sediment will be more effectually arrested and when once arrested will not be washed out of the pan by the current of water flowing thereover.

Another object of my invention is to provide each of a number of tiers of pans with an independent water sealed inlet.

My invention has for its object finally to improve the construction and arrangement of parts generally whereby the same will be cheaper, simpler and of increased efficiency.

With these ends in view my invention consists in certain features of novelty fully described herein with reference to the accompanying drawings and more particularly pointed out in the claims.

In the said drawings, Figure 1 is a vertical longitudinal section of my improved apparatus, taken on the line 1—1 Fig. 2. Fig. 2 is an end view thereof with one of the heads of the shell removed and portions of the filtrant pans broken away. Fig. 3 is an enlarged detail sectional view taken transversely of one of the pans. Fig. 3ª is a detail view of a modification hereinafter explained. Fig. 4 is a similar view taken longitudinally of one of the pans. Fig. 5 is an end view of the upper part of the shell with its head removed, showing a modified form of water supply or inlet hereinafter described. Fig. 6 is a vertical longitudinal section taken on the line 6—6, Fig. 5, and Fig. 7 is an end view of the lower part of the shell showing the filtrant pans removed and water pans inserted in their stead.

Like signs of reference indicate like parts throughout the several views.

In the drawings I have shown and in the specification I will describe my improvements in connection with a live steam as contradistinguished from an exhaust steam feed water heater and purifier, but it will nevertheless be understood that the said form of purifier is but an example of the various forms to which my improvements are applicable, and I therefore do not wish to be understood as limiting my invention to the particular type herein shown and described.

1 is the shell or casing of the purifier and heater which is preferably cylindrical in form and provided at one end with a head 2 permanently fixed therein in any suitable way as by means of rivets or bolts 3; while the other end of such shell is provided with a flange 4 secured thereto in any suitable manner and to this flange is secured by bolts 5 a removable head 6, which if desired may be provided with a lifting lug 7.

Arranged within the shell at suitable intervals apart throughout its length and on each side thereof are a number of brackets 8 which are preferably secured directly to the sides of the shell by means of rivets or bolts 9, or in any other suitable way. These brackets 8 which are preferably three in number on each side form supports for the water and filtrant pans 10, 11, respectively at the sides of the shell and they may be at the mid-length and each end of the shell. Each of these brackets 8 is formed with vertical edges adjacent to each of the pans and to these edges are secured the vertical flanges 12 of a number of longitudinal angle-irons whose horizontal flanges 13, see Fig. 3, constitute shelf-like projections extending inward under the pans 10 and upon which the pans are directly supported by means of some suitable devices for holding the pans slightly aloof from the projections 13.

The means for supporting the pans upon the projections 13 preferably consist of a number of anti-friction rollers 14 mounted in openings in the angle-irons at suitable intervals throughout their length as shown in Fig. 1, and having their pintles seated in any suitable bearings such as brackets 15 secured to the angle-irons by screws or rivets 16. The anti-friction rollers 14 project partly below the lateral portions of the angle irons in order that the pans when being inserted will not be obstructed by the rollers, but will strike against the upper half only of the roller, and thus be deflected over the latter.

The pans 10 are so constructed that the water is free to discharge over their side edges as well as at their ends and thus it will be seen that the shelf-like projections 13 while serving to support the pans, constitute deflectors for directing the water dripping over the edge of one pan, into the next pan below; and also that while the anti-friction rollers 14 serve to relieve the pans of frictional contact with the projections 13 and thus enable them to be more readily inserted into or withdrawn from the shell, they at the same time hold the pans aloof from the projections 13 and permit a free passage for the steam and water between the projections 13 and the bottom of the pans. The upright flanges 12 of the angle-irons while serving as means for connection of the angle-irons to the brackets 8, also constitute deflectors for preventing the water which runs over the side edges of the pans from escaping past the angle-irons between the latter and the shell without falling into the pans.

The projections 13 of the angle-irons are continuous substantially throughout the extent of the pans, not only for the purpose of directing the water falling upon them into the pans below, but for the purpose of forming smooth, unbroken surfaces for the ends of the pans to slide on when being inserted should they be tipped too low to strike the upper sides of the rollers 14. It is obvious therefore that the rollers instead of being secured to the angle-irons might be secured to the pans without materially affecting the result.

The pans 10 are preferably arranged in two tiers one on each side of the shell and the outer edges of the pans in each tier are supported by the brackets 8 and angle-irons to the sides of the shell as described, while the inner edges of the tiers are supported by a number of uprights 17 which correspond in location with reference to the length of the shell, to that of the brackets 8 and they are arranged between the tiers of pans along the center of the shell as more clearly shown in Fig. 2. These uprights 17 are provided at each end with feet or flanges 18 which are secured by rivets or other suitable means to the upper and lower sides of the shell respectively; and the uprights 17 have secured to each side thereof a number of angle-irons $12^a$ which correspond in form and arrangement with the angle-irons 12, 13, and they are likewise provided and for the same purpose with the anti-friction rollers $14^a$ which may be similar in construction and arrangement to the rollers 14 already described. By this means it will be seen that the overflow at the inner edges of the pans will be caught by the angle-irons $12^a$ and directed from one pan into the next pan below. The angle-irons $12^a$ are also duplicated at the inner edges of the filtrant pans 11 and these angle-irons are likewise provided with the anti-friction rollers $14^a$ for the purpose, in this instance, of relieving the friction of the filtrant pans on the angle-irons when the pans are being withdrawn or inserted. The outer edges of the filtrant pans 11 are supported by anti-friction rollers $14^x$ similar to the rollers 14, which are journaled in angle-irons $12^x$ secured to the lower ends of the brackets 8.

In order that the pans 10, 11, may not shift out of place laterally either while being inserted or during the use of the apparatus, I provide the under sides of such pans with guides 19 which are constituted by angle-irons secured to the pans by suitable rivets or otherwise as shown in Fig. 3, and having one flange depending so as to come against the edges of the lateral projections of the angle-irons secured to the brackets 8 and uprights 17; while those on the filtrant pans 11 are arranged to engage with the vertical flanges of the angle-irons $12^x$ which are turned downward against the vertical edges of the brackets 8. These guides 19 extending as they do lengthwise of the pan, serve to stiffen the pans longitudinally and prevent the pans from bending transversely when being inserted, a feature to which too much importance cannot be attached for it is readily seen that the least irregularity in the plane of the pan will cause the water to discharge too profusely at that point while there will be but little or no over-flow at other points.

The surfaces of the pans at suitable intervals throughout their lengths are provided with transverse ribs 20 secured thereto in any suitable manner and extending throughout their entire width. Heretofore these ribs have been arranged with a slight space between them and the walls of the pans alternately at opposite ends so that the water would be compelled to take a tortuous passage in passing along the pan. This arrangement however I have found objectionable in that the lime or other sediment which might otherwise lodge against the ribs, is caught up by the current and carried along to the end of the pan where it discharges on the next and so on through the apparatus, thus destroying the function which the ribs are designed to perform. With the ribs extending entirely across the pans however as in my present invention, the current is compelled to pass over the upper edges, and that portion of the water which is below their edges is comparatively quiescent and consequently the sediment which lodges against them is not disturbed by the super-current. The intermediate ribs are shallower than the pan, but the end ribs 20ª are of the same depth so that the entire discharge or overflow will not take place at the end of the pan. A further advantage to be gained in extending the ribs 20 entirely across the pans is that the pans are rendered very rigid transversely and such ribs co-act with the longitudinal guides 19 in forming a rigid frame which receives the entire strain and relieves the thin material of the pan of any bending tendency when being inserted or withdrawn or otherwise handled when not within the shell.

If desired the discharge ends of the pans may be provided with bottom perforations 20ˣ to relieve the water and prevent too violent discharge at those points.

In order to prevent undue movement of the pans longitudinally during transportation of the apparatus or at other times when such movement would be liable to occur, I provide each of them with a fastening which preferably consists of a linch-pin or bolt 21 passing through the bottom of the pan and engaging in the lateral projection 13 below it as shown in Fig. 4. These pins or fastenings 21 may be readily removed when it is desired to remove the pans. The same arrangement may be provided for the filtrant pans 11 as shown at 21ª in Fig. 1.

The two tiers of pans 10 instead of being provided with a common supply as heretofore, are each provided with an independent inlet or supply as shown more clearly in Fig. 2. Heretofore the tiers have been supplied from a common pan arranged intermediate of the two tiers and discharging into both. The great objection to this prior form is that unless the intermediate pan be strictly level at all times, the water will overflow more on one side than on the other, and in many instances the entire overflow is confined to one side only. By providing each tier of pans with its independent supply, however, as in my invention, I entirely avoid this objection. And it will also be seen that by dispensing with this intermediate pan I am enabled to carry the uprights 17 straight up to the top of the shell each in the form of a plain strip and secure the same at a single point; whereas before, a fork or bifurcation at the upper end of this upright was necessary. Instead of the common pan of the prior form I employ a two-way pipe each of whose branches communicates at its inner end with a common water supply pipe 22 while each of its outer ends is provided with an upturned nozzle 23 projecting over one of the tiers of pans, the nozzles being upturned it will be seen that they provide the supply pipe with a water seal and thus prevent water-hammer. The water discharging from the nozzles 23 will fall into the upper pans 10 and as will be understood will overflow at the ends and edges of such pans and run onto the next one below and so on down until the bottom pan of each tier is reached. When the water reaches this pan it discharges directly through a number of perforations 24 formed at suitable intervals throughout its surface, and comes in contact with the filtrant 25 contained in the pans 11 and preferably consisting of crushed coke, but any other suitable filtrant material may be employed. After percolating through the filtrant and being relieved of any impurities which might escape past the ribs 20 in the pans, it discharges directly from the bottom of the filtrant pans through a number of perforations 26 and collects in the bottom of the shell whence it is drawn off through the boiler pipe 27. The latter if desired may be provided with a shield or deflector 28 arranged over its end for preventing direct discharge thereinto. Any sediment which might find its way into the bottom of the shell may be blown off through the blow-off 29, the end of the boiler pipe being arranged above the bottom of the shell as shown to prevent such sediment from passing into the boiler.

The steam is supplied through the pipe 30, and 31 is the flange for the attachment of a circulating pipe which is in communication with a suitable pump not shown, and the boiler, for drawing off the gases that emanate from the water and steam. This pipe preferably enters the shell at a point near the water inlet which is the greatest source of the gas to be removed.

33 is a glass gage of any suitable construction for indicating the level of the water in the shell.

Inasmuch as the angle irons 12, 13, are continuous, the guides 19 may if desired be in form of short depending lugs or pins 19ª as shown in Fig. 3ª.

Another means of providing a water sealed inlet for the water and at the same time supplying each tier of pans independently, is shown in Figs. 5 and 6. In this form I employ two pipes or nozzles 34 which depend through the upper side of the shell and overhang the tiers of pans respectively. These pipes 34 are connected by a three-way coupling 35 to the main supply pipe 22, and each of the branches of the said coupling with which the pipes 34 are connected is provided with a goose-neck 36 thus forming a water seal for each of the pipes 34. The principal advantage of this form over that described and over prior forms is that it occupies no space within the shell and consequently it enables me to insert two additional pans 10ª and thus increase the capacity and efficiency of the apparatus.

When it is not necessary that the water be filtered after having passed over the pans 10, 10ª, the filtrant pans may be removed; and in order that the space formerly occupied by them may be used to advantage, the brackets 8 and uprights 17 may, if desired, be provided at their lower ends with an additional number of angle irons 12—13—12ª for the reception of the additional pans 10 as shown in Fig. 7.

While I have been particular to describe the minute details of construction of the devices shown in the drawings, it will be understood nevertheless that the same are susceptible of various changes or modifications which would not alter the result described, and that therefore I do not limit my invention to them.

Having thus described my invention, what I claim as new therein, and desire to secure by Letters Patent, is—

1. A feed water heater and purifier having in combination a shell, pans adapted to fit within said shell, brackets secured within said shell and upon which said pans have sliding support; and guides secured to said pans for preventing their movement transversely, substantially as set forth.

2. A feed water heater and purifier having in combination, a shell, pans adapted to fit within said shell, shelf-like projections secured within said shell and projecting beneath said pans anti-friction rollers secured to said projections and serving to hold the pans aloof therefrom, and guides for holding the pans against transverse movement, substantially as set forth.

3. A feed water heater and purifier having in combination a shell, the pans adapted to fit within said shell, longitudinal angle-irons secured within said shell and having their flanges arranged in upright and horizontal positions respectively, and anti-friction rollers secured to and projecting partly above and partly below said lateral flanges for supporting the pans over and upon said lateral flanges, substantially as set forth.

4. A feed water heater and purifier having in combination a shell, brackets secured within said shell, the sliding pans, and anti-friction rollers secured at intervals to said brackets and supporting said pans, substantially as set forth.

5. A feed water heater and purifier having in combination a shell, a number of removable pans supported in said shell, and ribs extending entirely across said pans transversely on their upper sides, said ribs being less in height than the sides of the pans, whereby the bulk of the water will flow lengthwise of the pans, substantially as set forth.

6. A feed water heater and purifier having in combination a shell, a number of removable pans having sliding support within said shell, transverse ribs arranged on the upper sides of said pans and longitudinal irons arranged along the bottom of said pans, substantially as set forth.

7. A feed water heater and purifier having in combination a shell, angle-irons supported longitudinally within said shell, pans arranged to slide on said angle-irons, and pins or bolts depending from said pans and engaging with said angle-irons, substantially as set forth.

8. A feed water heater and purifier having in combination, a shell, a number of tiers of pans supported in said shell, and an independent water inlet pipe having a water seal, discharging into each of said tiers of pans, substantially as set forth.

9. A feed water heater and purifier having in combination a shell, a number of tiers of pans adapted to fit within said shell, the uprights 17 extending between said tiers of pans and being secured at their upper and lower ends to the upper and lower sides respectively of said shell, supports on said uprights for the inner edges of said pans, and an independent water supply pipe arranged directly over and leading or discharging directly into the upper pan of each tier, substantially as set forth.

10. A feed water heater and purifier having in combination a shell, a number of tiers of pans within said shell, a water supply nozzle leading to each of said tiers, and a three-way coupling connecting said nozzle to the water supply and being provided with upturned goose-necks forming water seals, substantially as set forth.

11. A feed water heater and purifier having in combination a shell provided at one end with a removable head, water pans arranged within said shell and the lower one of which being provided with perforations, and a filtrant pan arranged under said perforated pan and having sliding support within said shell whereby said filtrant pan may be withdrawn from one end of the shell, substantially as set forth.

12. A feed water heater having in combination a shell, the filtrant pans having perforated bottoms, a discharge pipe leading upward into said shell, and a shield having an imperforate top arranged over said pipe, substantially as set forth.

EDWARD G. T. COLLES.

Witnesses:
F. A. HOPKINS,
EDNA B. JOHNSON.